United States Patent [19]

Withers et al.

[11] 4,299,405
[45] Nov. 10, 1981

[54] TRACTOR BALLAST WEIGHT ASSEMBLIES

[75] Inventors: John A. Withers, Barnsley; Alec Sykes, Huddersfield, both of England; Stephen M. Brogan, Overath, Fed. Rep. of Germany

[73] Assignee: David Brown Tractors Limited, Huddersfield, England

[21] Appl. No.: 148,317

[22] Filed: May 9, 1980

[30] Foreign Application Priority Data

May 16, 1979 [GB] United Kingdom ............... 16926/79

[51] Int. Cl.³ ............................................. B60R 27/00
[52] U.S. Cl. ..................................... 280/759; 280/495
[58] Field of Search ................ 280/759, 495, 504, 515

[56] References Cited

U.S. PATENT DOCUMENTS 3,888,507  6/1975  Berghausen ......................... 280/759
3,944,252  3/1976  Barth .................................. 280/759

FOREIGN PATENT DOCUMENTS 1916996 10/1970  Fed. Rep. of Germany ...... 280/759
2429901  1/1976  Fed. Rep. of Germany ...... 280/759

Primary Examiner—Robert R. Song

[57] ABSTRACT

Tractors often have front ballast weights to counterbalance rear-mounted implements. These weights are usually contiguous parallel cast plates disposed in longitudinal vertical planes. Transversely aligned recesses are often provided in the front edges of the plates to form a towing mouth, and complementary semi-cylindrical grooves in the side faces of the plates form cylindrical holes intersecting the towing mouth, one such hole containing a hitch pin. Side loading is transmitted back to the weakest section of those weights carrying the hitch pin; and the hitch pin is a loose fit in its hole because the latter is formed by cast grooves. To avoid these disadvantages, the grooves are omitted and a clevis fitted partially within the recesses is clamped to the tractor frame by bolts passing through longitudinal holes in the respective weights and has upper and lower jaws with vertically aligned machined holes for the hitch pin.

4 Claims, 4 Drawing Figures

TRACTOR BALLAST WEIGHT ASSEMBLIES

BACKGROUND OF INVENTION

The invention relates to a front ballast weight assembly for agricultural tractors, and more particularly to such an assembly incorporating a towing point. Such weights are necessary to counterbalance the heavy implements frequently mounted on the rear of the tractor and thus prevent the stability and the steering of the tractor from being dangerously impaired.

Known front ballast weight and towing point assemblies comprise a plurality of weights in the form of contiguous parallel plates clamped to the tractor frame in longitudinal vertical planes, transversely aligned recesses in the front sides of the weights forming a towing mouth, and a semi-cylindrical groove in each face of each weight, each groove forming together with the adjacent groove in the adjacent plate a cylindrical hole intersecting the towing mouth for the reception of a hitch pin. These known assemblies have the disadvantages that side loading from a drawbar is transmitted back to the weakest section of those weights carrying the hitch pin, which section is located where the weights are clamped to the tractor frame; that the hitch pin is a very loose fit in its hole because considerable clearance is necessary due to the grooves forming said hole being cast; and that there is no towing point available when the weights are not being used.

The object of the present invention is to avoid the aforesaid disadvantages.

SUMMARY OF INVENTION

According to the invention, a front ballast weight and towing point assembly for an agricultural tractor comprises a plurality of weights in the form of contiguous parallel plates clamped to the tractor frame in longitudinal vertical planes, and a clevis which fits partially within transversely aligned recesses in the front sides of the weights and has upper and lower jaws with vertically aligned holes for the reception of a hitch pin and a rear wall interconnecting said jaws and having at least one hole through which and through an aligned longitudinal hole in one of the weights a bolt is passed to clamp the clevis to the tractor frame.

BRIEF DESCRIPTION OF DRAWINGS

A preferred embodiment of the invention will now be described, by way of example, with reference to the accompanying drawings of which.

DESCRIPTION OF PREFERRED EMBODIMENT

Figure 1:
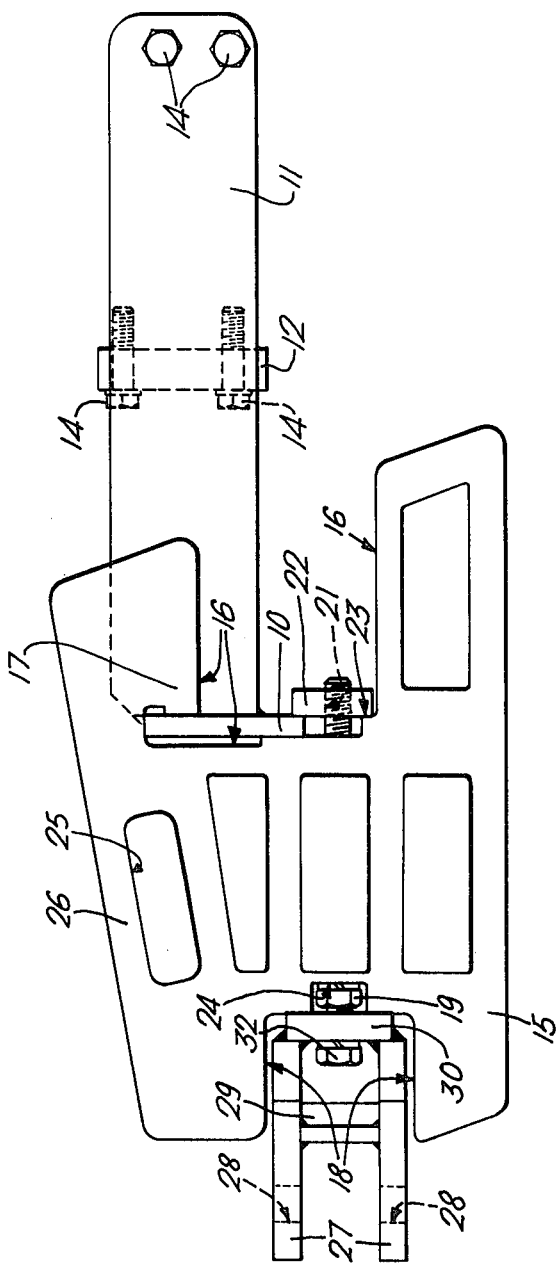
FIG. 1 is a side elevation of a front ballast weight and towing point assembly for an agricultural tractor.
Figure 2:
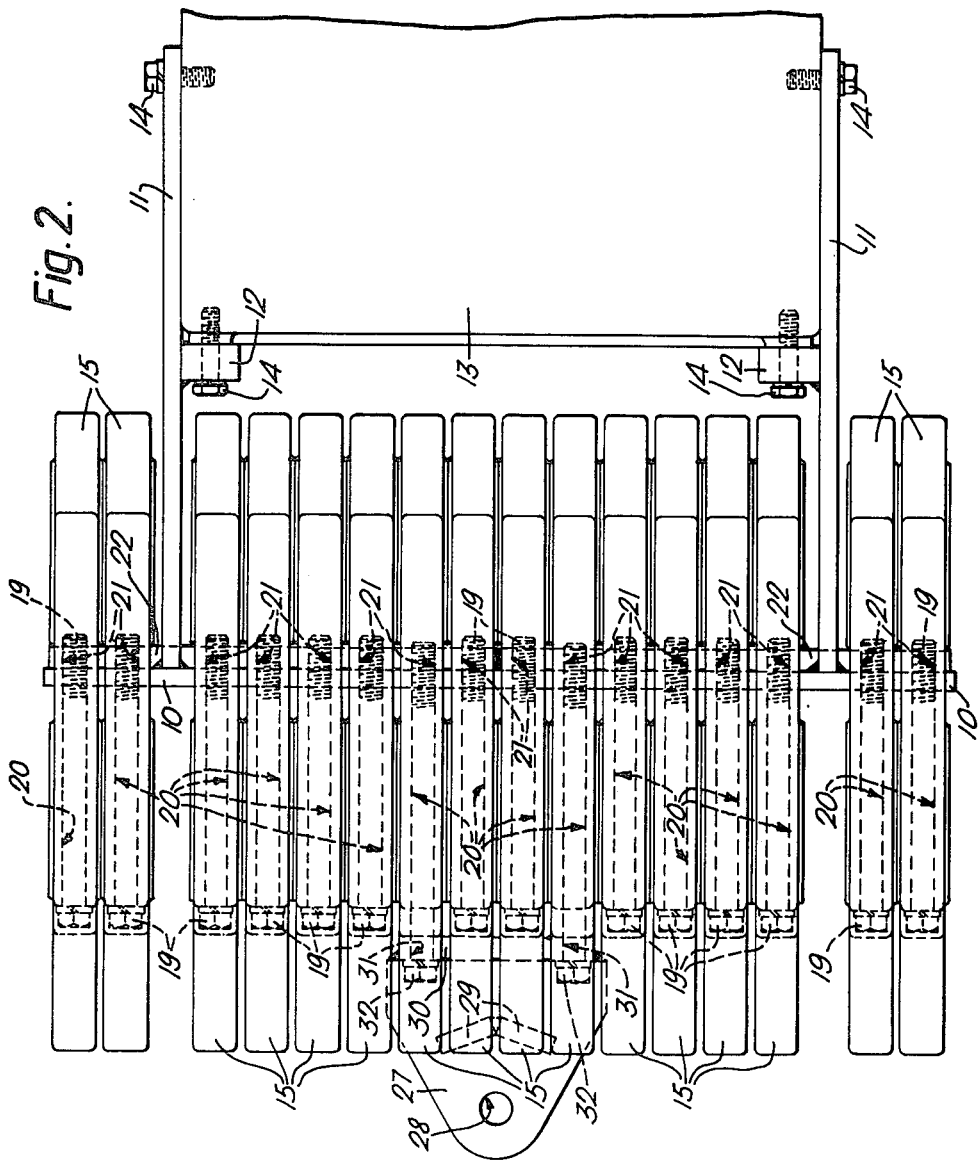
FIG. 2 is a plan view thereof.
Figure 3:
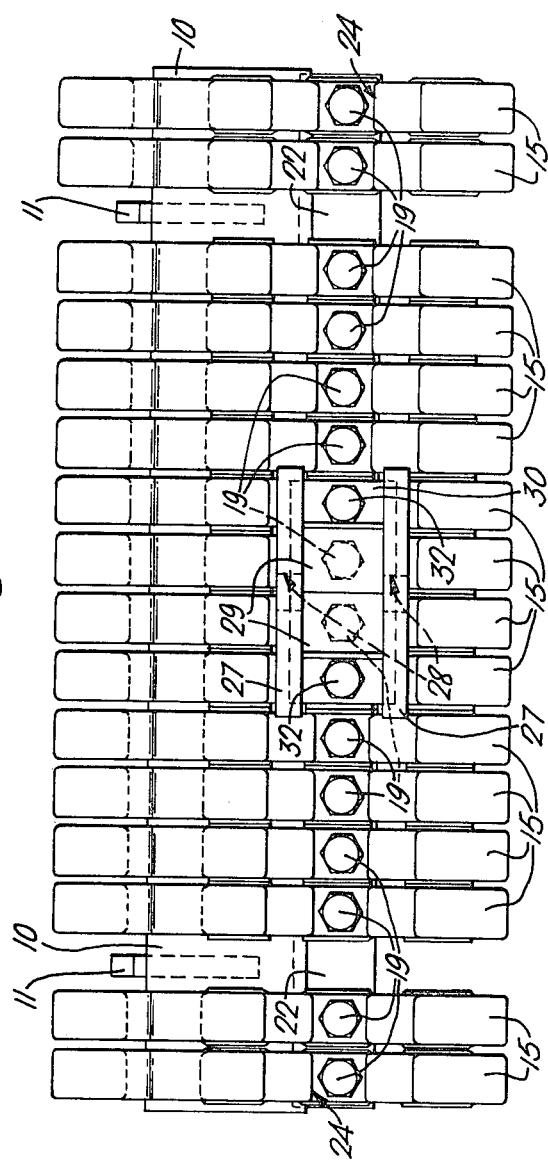
FIG. 3 is a front elevation thereof.

Referring now to FIGS. 1 to 3 of the drawings, a transverse member 10, two side members 11 and two lugs 12 are welded together to form a bracket which is secured to the front end of the frame 13 of an agricultural tractor by means of set-screws 14. Each of a plurality of weights in the form of substantially four-sided cast plates 15 has a recess 16 in its rear side, that part of the weight intended to be disposed above said recess having the form of a claw 17 adapted to be hooked over the transverse member 10 so that the major portion of the weight is in front of said member. Each weight also has a recess 18 in its front side and is adapted to be clamped to the transverse member 10 by a bolt 10 which passes through a longitudinal hole 20 interconnecting the front and rear recesses 18, 16 and engages in one of a row of screw-threaded holes 21 in two longitudinally aligned bars 22 spanning the lower rear edge of the transverse member 10 and an abutment 23 within the rear recess 16 of each weight. The head of the bolt 19 fits within a recess 24. The requisite number of weights to give the desired ballasting effect can thus be assembled in contiguous parallel relationship in longitudinal vertical planes. Each weight is provided with a rectangular aperture 25 near the mid-point of its upper side so that the portion of the weight between said aperture and said side forms a handle 26.

As the weights are identical to one another, the front recesses 18 therein are transversely aligned when a plurality of the weights are assembled in operative position. A clevis fits partially within the transverse groove formed by the aligned front recesses, and projects forwardly from the front sides of the assembled weights. The clevis is a welded structure comprising upper and lower walls 27 constituting jaws in which vertically aligned accurately machined holes 28 are formed forwardly of the front sides of the weights for the reception of a hitch pin (not shown), two strengthening blocks 29, and a rear wall 30 in which there are formed two holes 31 so spaced apart transversely as to be aligned with the respective longitudinal holes 20 in two of the weights. Instead of clamping these two weights to the transverse member 10 by the aforementioned bolts 19, two longer bolts 32 are provided which pass through the holes 31 in the rear wall 30 of the clevis as well as the holes 20 in said two weights and engage in the appropriate screw-threaded holes 21 in the bars 22 so as to clamp both the clevis and said two weights to the transverse member 10.

Figure 4:
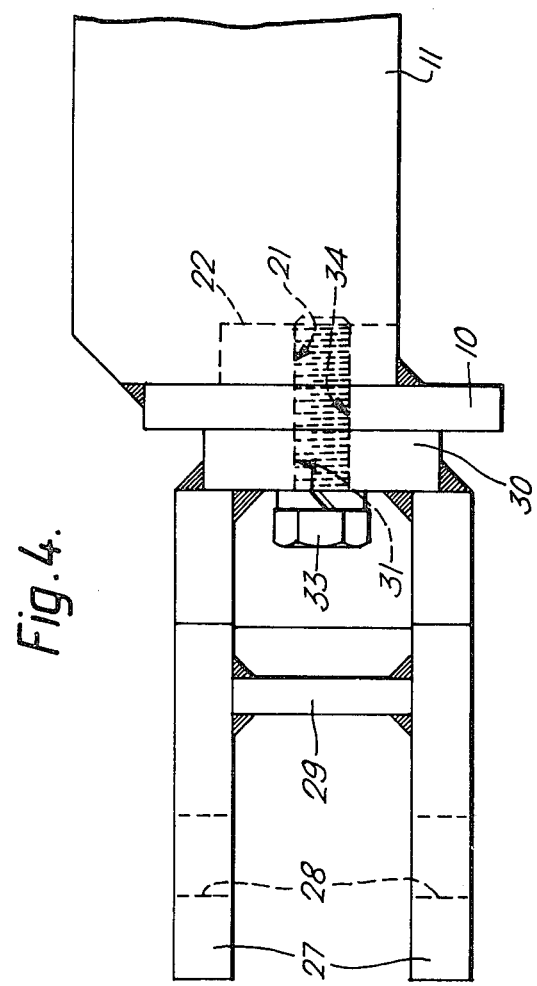
FIG. 4 is a side elevation showing the towing point fitted directly to the tractor when the weights are not being used.

In operation, the assembly has good resistance to side loading from a drawbar due to the manner in which the clevis is supported by a plurality of the weights and clamped to the bracket secured to the tractor frame 13, the whole assembly thus forming a very rigid structure. The hitch pin is a good fit in the vertically aligned holes 28 in the clevis due to said holes being accurately machined. When the weights are not being used because front ballasting is not required, the clevis is clamped directly to the transverse member 10 as shown in FIG. 4 by means of two short bolts 33 which pass through the holes 31 as well as two similarly spaced holes 34 formed in the transverse member 10 and engage in two of the screw-threaded holes 21 in one of the bars 22.

In a modification, the two longitudinally aligned bars provided with a row of screw-threaded holes are replaced by a single bar. In another modification, said bars are replaced by a plurality of individual nuts each of which, or a washer on each of which, is adapted to span the lower rear edge of the transverse member and the abutment within the rear recess of the associated weight.

We claim:

1. A front ballast weight and towing point assembly, for an agricultural tractor, comprising a plurality of weights in the form of contiguous parallel plates clamped to the tractor frame in longitudinal vertical planes, and a clevis which fits partially within transversely aligned recesses in the front sides of the weights and has upper and lower jaws with vertically aligned holes for the reception of a hitch pin and a rear wall interconnecting said jaws and having at least one hole through which and through an aligned longitudinal hole in one of the weights a bolt is passed to clamp the clevis to the tractor frame.

2. An assembly according to claim 1, wherein the longitudinal hole is formed in every weight and a bolt is passed through each hole to clamp the associated weight to a bracket secured to the tractor frame and including a transverse member, each such bolt engaging in one of a row of screw-threaded holes in at least one bar located behind said member, and wherein every weight has a claw adapted to be hooked over said member with its major portion in front of said member.

3. An assembly according to claim 1, wherein each weight is provided with an aperture near its upper side forming a handle.

4. An assembly according to claim 1, wherein the clevis can be clamped directly to the tractor frame when the weights are not being used.

* * * * *